Figure 2:
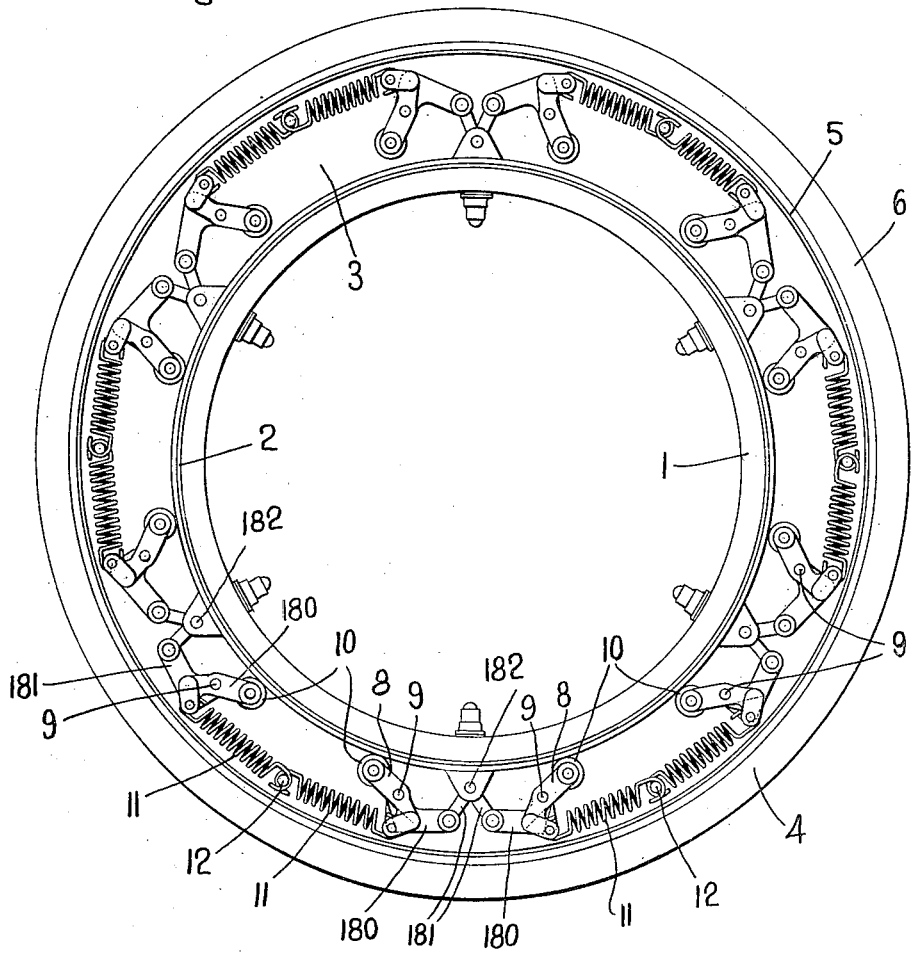

J. A. STAHLE.
RESILIENT WHEEL.
APPLICATION FILED OCT. 18, 1912.
1,126,115.
Patented Jan. 26, 1915.
6 SHEETS—SHEET 1.
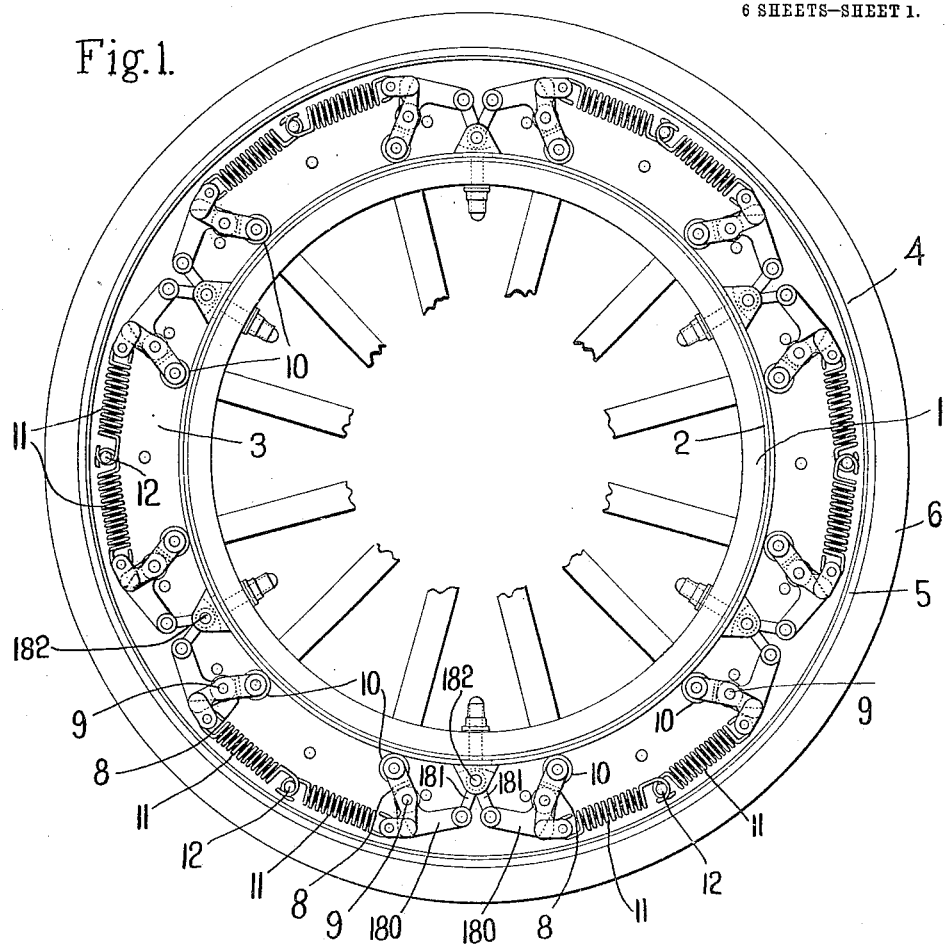
Fig. 1.
Fig. 1ª
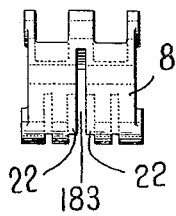
Fig. 1ᵇ
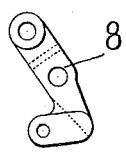
Fig. 1ᶜ
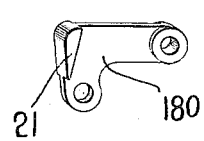
Witnesses.
Thomas J. Drummond
Warren O'Neil
Inventor.
John A. Stahle,
by Edwards Heard & Smith
Attys.

J. A. STAHLE.
RESILIENT WHEEL.
APPLICATION FILED OCT. 18, 1912.

1,126,115.

Patented Jan. 26, 1915.
6 SHEETS—SHEET 3.

Witnesses.
Thomas J. Drummond
Warren O'Neil

Inventor.
John A. Stahle,
by Edwards Heard & Smith
Attys.

J. A. STAHLE.
RESILIENT WHEEL.
APPLICATION FILED OCT. 18, 1912.
1,126,115.
Patented Jan. 26, 1915.
6 SHEETS—SHEET 4.
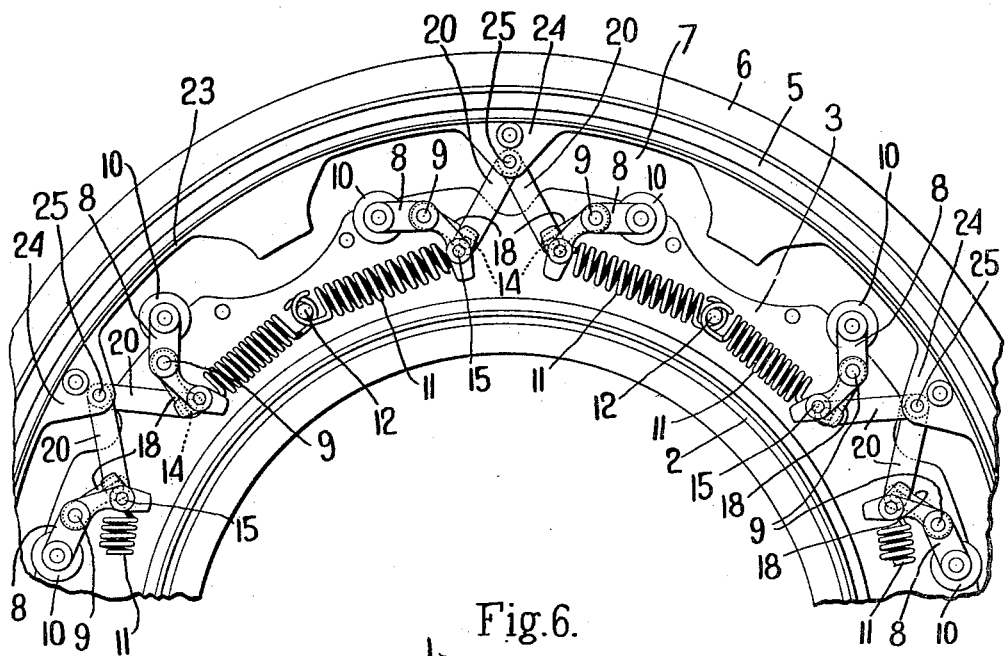
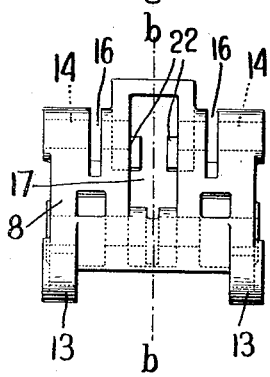
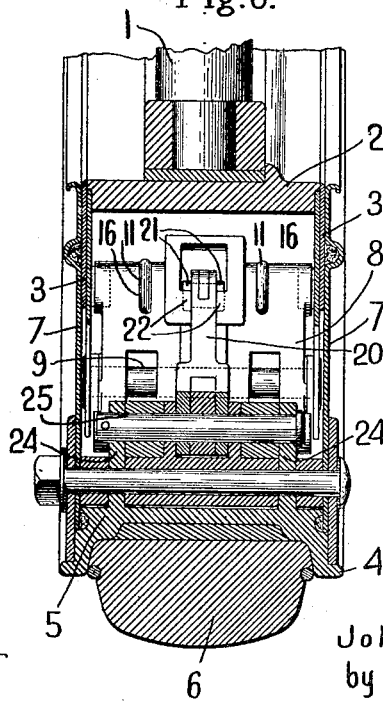
Witnesses.
Thomas J. Drummond
Warren O'Neil
Inventor.
John A. Stahle,
by Edwards Hard & Smith
Atty's.

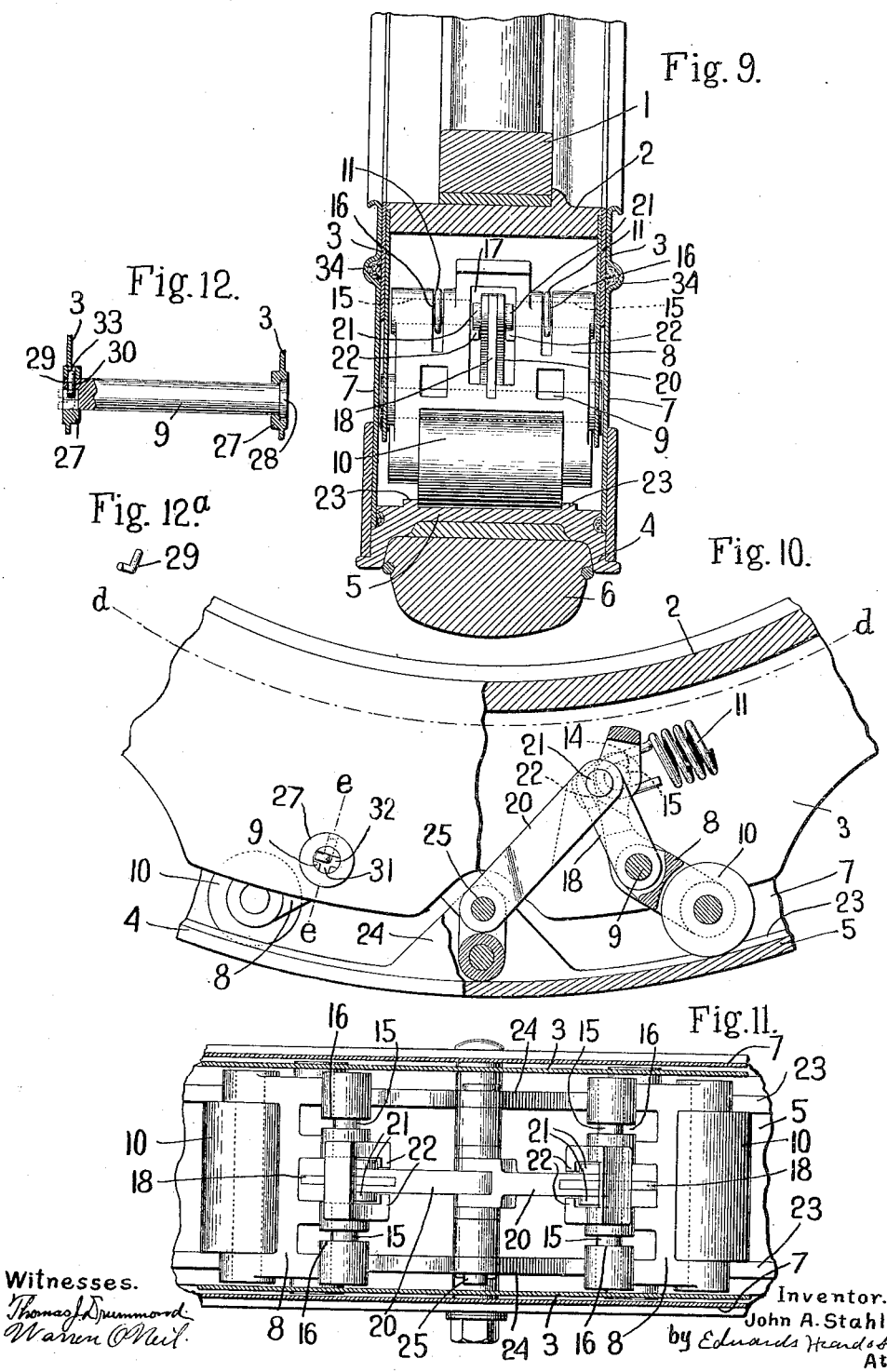

J. A. STAHLE.
RESILIENT WHEEL.
APPLICATION FILED OCT. 18, 1912.
1,126,115.
Patented Jan. 26, 1915.
6 SHEETS—SHEET 6.
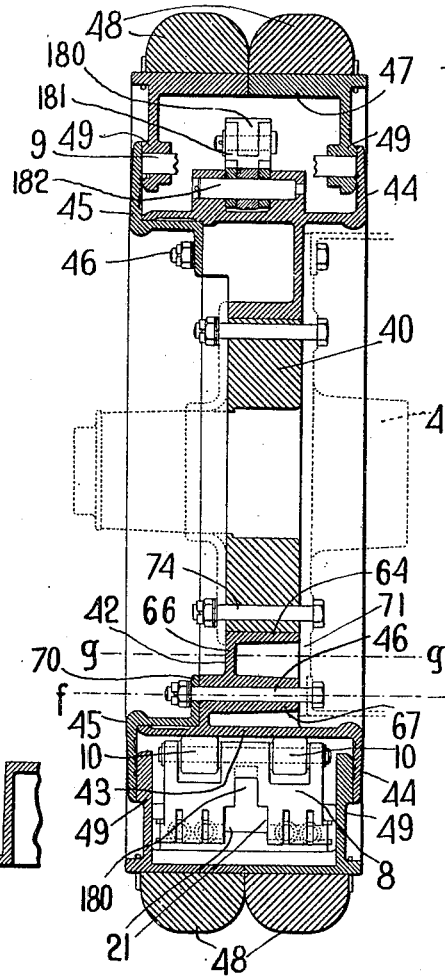
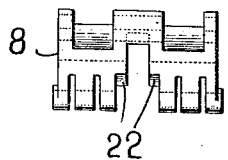
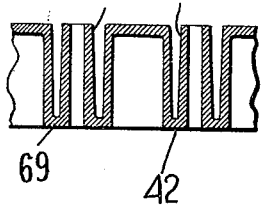
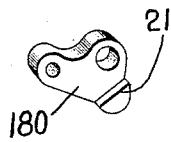
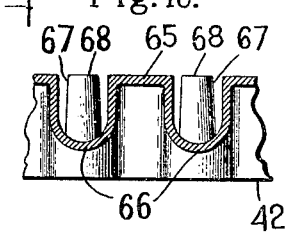
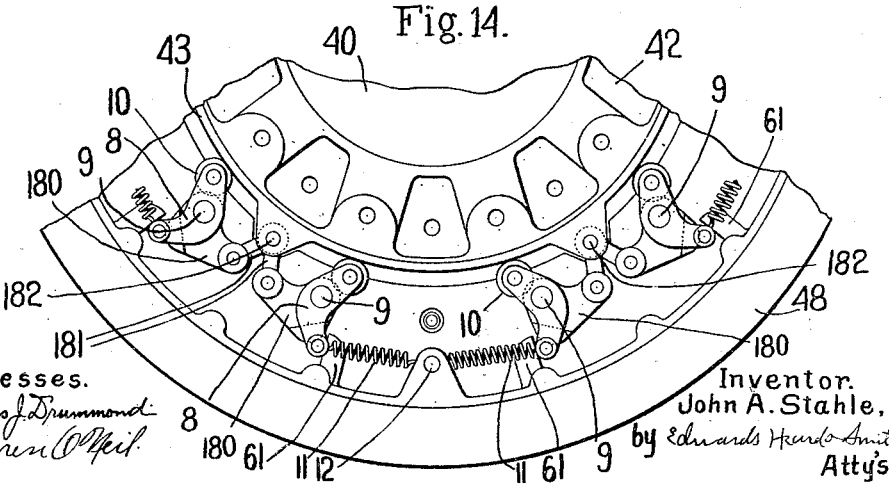
Witnesses.
Thomas J. Drummond
Warren O'Neil
Inventor.
John A. Stahle,
by Edwards Hurd & Smith
Atty's.
THE NORRIS PETERS CO., PHOTO-LITHO., WASHINGTON.

UNITED STATES PATENT OFFICE.

JOHN A. STAHLE, OF BOSTON, MASSACHUSETTS, ASSIGNOR TO STAHLE MECHANICAL TIRE COMPANY, LIMITED, OF KITTERY, MAINE, A CORPORATION OF MAINE.

RESILIENT WHEEL.

1,126,115.  Specification of Letters Patent.  Patented Jan. 26, 1915.

Application filed October 18, 1912.  Serial No. 726,507.

*To all whom it may concern:*

Be it known that I, JOHN A. STAHLE, a citizen of the United States, residing at Boston, county of Suffolk, State of Massachusetts, have invented an Improvement in Resilient Wheels, of which the following description, in connection with the accompanying drawing, is a specification, like characters on the drawing representing like parts.

This invention relates to resilient wheels of that type wherein a plurality of load-supporting members in the form of pivoted levers are confined between an inner and an outer rim of the wheel capable of having movement relative to each other and springs are connected to the load-supporting members for yieldingly sustaining the load.

The objects of my invention are to provide a novel wheel of this nature having an improved construction in which the connections between the springs and the load-supporting members are simplified, and in which the load is sustained at all times by all the springs throughout the extent of the wheel.

Other objects of the invention are to improve generally resilient wheels of this type, all as will be more fully hereinafter described and then pointed out in the appended claims.

Figure 3:
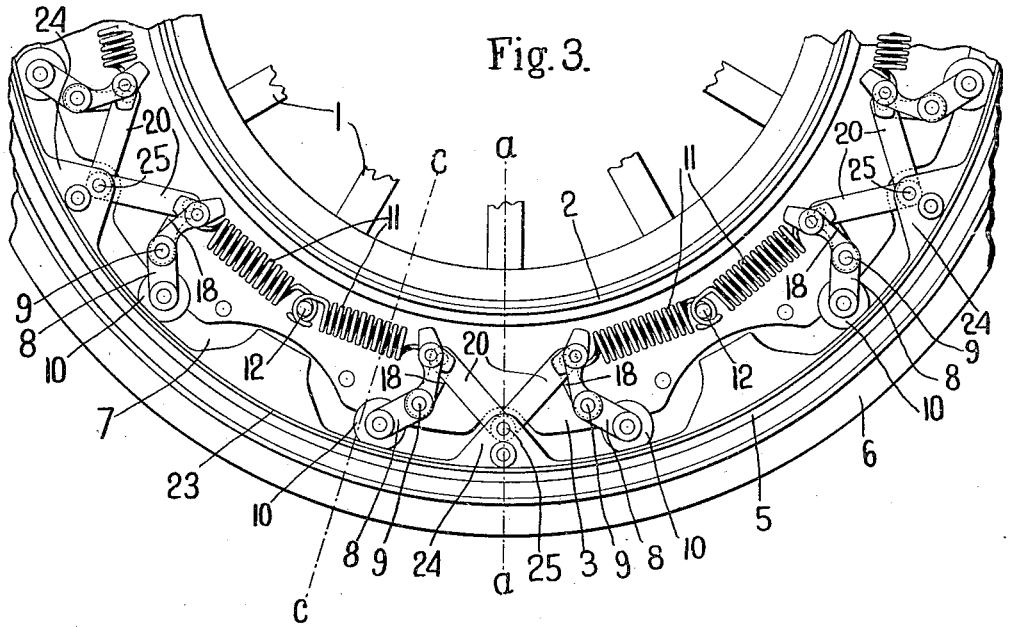
Figure 4:
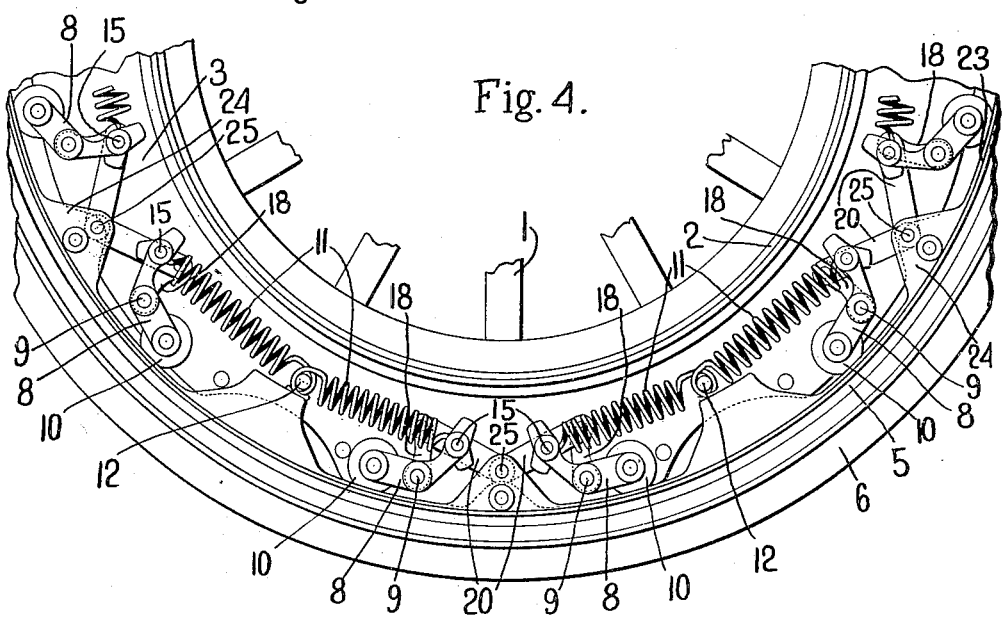

Referring now to the drawings, Figure 1 is a view of a wheel embodying my invention with the hub broken out and a part removed to show the arrangement of load-supporting members and springs when the wheel is not loaded; Fig. 1$^a$ is a view of one of the load-supporting members shown in Fig. 1; Fig. 1$^b$ is a side view of the load-supporting member shown in Fig. 1$^a$; Fig. 1$^c$ is a perspective view of one of the members 180; Fig. 2 is a view similar to Fig. 1 showing the wheel sustaining a load; Fig. 3 is an enlarged sectional view showing the normal position of the load-supporting members and springs in a wheel having a slightly different construction from that shown in Figs. 1 and 2; Fig. 4 is a similar view showing the position of the load-supporting members and springs at the under side of the wheel when the latter is sustaining a load; Fig. 5 is a similar view showing the position of the springs at the upper side of the wheel when the latter is sustaining a load; Fig. 6 is an enlarged section on substantially the line $a$—$a$, Fig. 3; Fig. 7 is a view of one of the load-supporting levers; Fig. 8 is a sectional view through the lever on the line $b$—$b$, Fig. 7; Fig. 9 is a sectional view on the line $c$—$c$, Fig. 3; Fig. 10 is a side view of Fig. 9 with part of the side plates broken out; Fig. 11 is a section on the line $d$—$d$, Fig. 10; Fig. 12 is a section on the line $e$—$e$, Fig. 10; Fig. 12$^a$ is a view of the locking key; Fig. 13 is a vertical sectional view through a truck wheel embodying my invention; Fig. 14 is a partial side view of Fig. 13 with the side plates removed; Fig. 15 is a section through the ring 42 on the line $f$—$f$, Fig. 13; Fig. 16 is a section through the ring 42 on the line $g$—$g$, Fig. 13; Fig. 17 is a view of the load-supporting members shown in Fig. 14; Fig. 18 is a view of the link shown in Fig. 14.

My improved wheel comprises a wheel body, an outer annular rim carrying the tire or tread member, and the yieldingly-sustained load-supporting members situated between the wheel body and the outer rim. The wheel body may have any suitable or usual construction, depending on the character of the wheel.

In Figs. 1 to 11 I have indicated the wheel body generally by 1 and it is provided with a rim 2 having side plates or flanges 3 extending therefrom, said side plates or flanges and rim 2 forming a channel-shaped rim.

The outer rim is shown generally by 4 and it comprises an annular band or member 5 adapted to carry a tread member 6 of rubber or any other suitable material, which member 5 has associated therewith flanges or side plates 7 that overlie the side plates 3.

Situated between the rim of the wheel body and the outer rim 4 are the load-supporting members in the form of spring-actuated levers. These levers may be pivoted either to the outer rim and bear against the inner rim, or wheel body, or they may be pivoted to the inner rim and have bearing against the outer rim. In Figs. 1 and 2 I have shown the former construction, and in Figs. 3, 4 and 5 I have shown the latter construction.

Referring first to Figs. 3 to 11 inclusive, the load-supporting members or levers are designated by 8 and they are pivotally mounted on pivotal pins 9 that are sustained in the flanges 3 of the wheel body rim. Each lever carries at its outer end one or more rolls 10 which is adapted to bear against the inner face of the member 5 of the outer rim, and each lever has connected thereto one end of a spring 11, the other end of which is connected to a pin or cross piece 12 sustained by the flanges 3. While these load-supporting levers may have any suitable shape, I prefer that shown in Figs. 7 and 8 wherein they are in the form of castings made with the forked ends 13 adapted to receive the rolls 10 and also provided with the apertures 14 adapted to receive pins 15 to which the springs 11 are connected, the members 8 having the slots 16 to receive the ends of the springs. Each load-supporting member 8 is also formed with a central opening 17 in which is pivotally sustained a radius bar 18, said radius bar being pivotally mounted on the pin 9. Each radius bar has connected thereto a link 20 and is provided with lateral projections 21 which are adapted to engage shoulders or projections 22 extending inwardly from the walls of the opening 17.

In the construction shown in Figs. 3 to 11, inclusive, the load-supporting members 8 are pivoted to the inner rim, that is, the pins 9 are sustained by the flanges 3, and the rolls 10 bear against the inner face of the outer rim which will preferably be provided with guide ribs 23 between which the rolls run. In this construction the links 20 are pivoted to the outer rim and for this purpose said outer rim is provided at suitable intervals with inwardly-extending flanges 24 sustaining pins 25 to which the outer ends of the links 20 are secured.

The load-supporting members are arranged in pairs with the members of each pair oppositely disposed, and there will, therefore, be two links 20 connected to each pin 25.

In the construction shown in Figs. 1 and 2, the pivotal pins 9 which support the load-supporting members 8 are carried by the flanges 7 of the outer rim, and said load-supporting members are so disposed that the rolls 10 thereof bear against the member 2 of the wheel body rim. The cross-bars 12 to which the springs 11 are attached are also sustained by the flanges 7 of the outer rim. In this embodiment the lost motion connection between the load-supporting members and the inner wheel body is somewhat different from that shown in Figs. 3 to 11, although it operates on the same principle.

The pins 9 have pivoted thereon members 180, the function of which is similar to that of the radius arms 18 shown in Figs. 3 to 11. These members 180 have a general L-shape with one end of the shorter arm pivotally mounted on the pin 9 and with the longer arm connected by a link 181 to the wheel body at 182. The load-supporting members 8 are provided with openings or slots 183, (see Fig. 1ᵃ) in which the members 180 are received and the members 180 are provided with lugs or lateral projections 21 adapted to engage shoulders 22 formed on the load-supporting members, said projections and shoulders 21 and 22 being substantially similar to those shown in Figs. 3 to 11. The springs 11 are connected directly to the outer ends of the load-supporting members 8.

Referring again to the embodiment shown in Figs. 3 to 11, the normal position of the parts when the wheel is unloaded is shown in Figs. 3 and 10. When the wheel sustains a load the wheel body will move downwardly relative to the outer rim, as will be obvious, and the wheel body rim and the outer rim at the upper and lower parts of the wheel will have the relative positions shown in Figs. 5 and 4. It will be seen from Fig. 4 that the displacement of the wheel body and the outer rim will force the rolls 10 against the inner face of the member 5, thus turning the levers or load-supporting members 8 against the action of the springs 11 and placing said springs under tension. At the upper side of the wheel the separating movement between the wheel body and the outer rim will also put the springs 11 under tension through the action of the links 20 and radius bars 18, for it will be seen that the links 20 will draw the radius bars backwardly and the engagement of the projections 21 on the radius bars with the lugs 22 on the load-supporting members 8 will swing the load-supporting members in the same direction relative to the wheel as is done by the engagement of the outer rim with the rolls 10 in Fig. 4, thus putting the springs 11 under tension. The construction thus is such that whenever the wheel sustains a load, all of the springs around the wheel are put under increased tension and thus assist in supporting the load.

When the load-supporting members 8 are moved into the position shown in Fig. 4 at the lower side of the wheel the radius bars 18 merely swing forwardly away from the levers 8. This radius bar construction provides a lost motion connection which permits the load-supporting members at the under side of the wheel to act freely in supporting the load independently from the links 20.

The pins 9 on which the load-supporting members are sustained may be secured in the flanges 3 in any suitable way. I prefer, however, the construction shown in Fig. 12 wherein these flanges are provided with thickened bearings 27 through which the pins extend. The pins are preferably headed at one end, as shown at 28, and are locked in place by a locking key 29. This key is in the form of an L-shaped pin, such as shown in Fig. 12ᵃ, and the end of the pin 9 is provided with the radial opening 30, the radial slot 31 in line with the opening and the cross slot 32. The bearing 27 is also provided with a radial aperture 33. The locking key 29 is inserted by introducing its longer end into the aperture 30 through the slot 31, as seen in the lower dotted line position Fig. 12, and then moving the key upwardly into the upper dotted line position, in which position the upper end thereof enters the aperture 33. The key is then turned so as to bring the short arm into the groove 32, as shown in Fig. 10. This securely locks the pin in place. The key is prevented from turning back into the dotted line position Fig. 12 by the overlying flanges 7.

It is my intention to fill or partially fill the space between the inner and outer rim with grease or some other suitable lubricant, and to prevent this lubricant from working out from between the plates 3 and 7, I propose to use the packing 34 which is received in annular grooves formed in one or the other of the overlapping plates.

The operation of the modification shown in Figs. 1 and 2 is substantially the same as that shown in Figs. 3 to 11. The normal position of the parts when the wheel is unloaded is shown in Fig. 1. When the wheel is loaded the parts assume the position shown in Fig. 2, the turning movement of the load-supporting members 8 at the lower side of the wheel putting the corresponding springs 11 under tension and the coöperation of the links 181, members 180 and load-supporting members at the top of the wheel putting the springs at the upper side of the wheel under tension. The lost motion connection shown in Figs. 1 and 2 has some advantages over that shown in Figs. 3 and 10. When during the separating movement of the wheel body and the outer rim at the upper side of the wheel the members 180 are brought against the shoulders 22 thereby to elongate the corresponding springs 11, the turning movement of the load-supporting members and the members 180 increases the angle gradually between the longer arms of the members 180 and the links 181 so that the pull on the springs 11 is more and more direct as the tension on the springs increases. Furthermore, by means of this construction a shorter link can be employed and the mechanism will take up somewhat less room than is shown in Figs. 3 and 4. It will be readily observed that the link 181 in Fig. 2 is much shorter than the link 20 in Fig. 3, and the structure is rendered more compact.

In Figs. 13 and 14 I have shown a wheel embodying my invention which is especially designed for a truck wheel. This wheel is formed with the central portion 40 which carries the usual hub 41. This central portion is preferably made from a hard wood block. On the exterior of this central portion 40 is a cast metal ring 42 which has formed integral therewith the annular portion 43 forming a track against which the rolls 10 bear and a flange 44. 45 is another annular member detachably secured to the member 42 by means of bolts 46, said member 45 constituting with the flange 44 the two side plates of the wheel body rim. The outer rim is shown at 47 and it sustains the tread members 48, and is provided with the inwardly-directed flanges 49 that fit between and overlap the flanges 44, 45. The load-supporting members 8 are pivotally mounted in the flanges 49 in a manner similar to that already described. The tire shown in Fig. 13 has a dual tread surface, but it will be obvious, of course, that the wheel may be of any width, depending on the use to which the wheel is to be put. The number of springs 11 may also be varied according to the load which the wheel is designed to support. In Fig. 13 provision is made whereby four springs may be secured to each load-supporting member, but a greater or less number of springs may be employed without departing from the invention.

The lost motion connection shown in Figs. 13 and 14 is quite similar to that shown in Figs. 1 and 2, and in Figs. 17 and 18 I have shown one of the load-supporting members 8 and one member 180 so as to better illustrate the constructional features and shape thereof. In Fig. 14 I have shown at 61 stops to engage the outer ends of the load-supporting members 8 to limit their swinging movement in one direction, and when the wheel is unloaded and the parts are in their normal position the levers will engage said stops.

The construction of the cast metal ring member 42 is clearly seen from the sectional views shown in Figs. 15 and 16. The said member 42 is provided with an inner band 64 which encircles and fits the wooden block 40, and this inner band 64 is connected to the outer band 43 by a web 65 that is formed with the U-shaped portion 66 that extends radially of the wheel. These portions 66 stiffen the flange and constitute what might be called spokes. The member 42 is formed with the bosses 67 through which the bolts 46 extend. The ends 68 of the bosses come flush with the outer wall of the web 65 and the opposite end 69 of the bosses furnishes a surface against which the flange 70 of the member 45 rests. The hub 41 of the wheel is provided with the flange 71 which overlies the web 65 and the end 68 of the bosses.

The hub is held in place by the bolts 74. This makes a very strong and yet light wheel body construction.

Having fully described my invention, what I claim as new and desire to secure by Letters Patent is:—

1. In a resilient wheel, the combination with a wheel body, of an outer rim encircling the body and capable of movement relative thereto, a plurality of load-supporting members pivoted intermediate of their ends to one of said parts and adapted to bear against the other part, springs acting on said members, a pivotally-mounted radius arm associated with each member, and links connecting said radius arms to the other part.

2. In a resilient wheel, the combination with a wheel body, of an outer rim encircling the body and capable of movement relative thereto, a plurality of load-supporting members pivoted intermediate of their ends to one of the parts and adapted to bear at one end against the other part, springs acting on the opposite ends of said members, a pivotally-mounted radius arm associated with each member, stops which limit the swinging movement of each radius arm in one direction relative to the members, and links connecting said arms with said other part of the wheel.

3. In a resilient wheel, the combination with a wheel body, of an outer rim encircling said body and capable of movement relative thereto, a plurality of load-supporting members pivoted intermediate of their ends to one of said parts and adapted to bear at one end against the other part, springs acting on the opposite ends of said members and tending to swing them forwardly, a pivotally-mounted radius arm associated with each member, stops which limit the forward swinging movement of each radius arm relative to its load-supporting member, and links connecting said arms to said other part of the wheel.

4. In a resilient wheel, the combination with a wheel body, of an outer rim encircling said body and capable of movement relative thereto, a plurality of load-supporting members pivoted intermediate of their ends to one of said parts and adapted to bear at one end against the other part, springs acting on the opposite ends of said members and tending to swing them forwardly, a pivotally-mounted radius arm associated with each load-supporting member and movable co-axially therewith, stops which limit the forward swinging movement of each radius arm relative to its load-supporting member, and links connecting said arms to said other part of the wheel.

5. In a resilient wheel, the combination with a wheel body, of an outer rim encircling the body, a plurality of load-supporting members pivoted intermediate of their ends to one of said parts and adapted to bear against the other part, springs acting on said members, and a connection between each of said members and said other part, which connection permits a relative movement in one direction between it and said members but prevents such movement in the opposite direction.

6. In a resilient wheel, the combination with a wheel body, of an outer rim encircling the body and capable of movement relative thereto, a plurality of load-supporting members pivoted intermediate of their ends and adapted to bear at one end against one of said parts and forked at the other end, springs acting on the forked ends of said members, a connecting member pivoted co-axially of each load-supporting member and occupying the forked end thereof, means connecting each connecting member to said other part, and coöperating shoulders, and stops on said connecting members and load-supporting members which limit the relative movement thereof in one direction.

In testimony whereof, I have signed my name to this specification, in the presence of two subscribing witnesses.

JOHN A. STAHLE.

Witnesses:
  LOUIS C. SMITH,
  FREDERICK H. GREENLEAF.

Copies of this patent may be obtained for five cents each, by addressing the "Commissioner of Patents, Washington, D. C."